April 23, 1957 W. M. SHANHOUSE 2,789,371
DEVICE FOR DEMONSTRATING BINOMIAL PROGRESSIVE EXPANSION
Filed June 13, 1952 4 Sheets-Sheet 1

INVENTOR
WILLIAM M. SHANHOUSE

BY
ATTORNEY

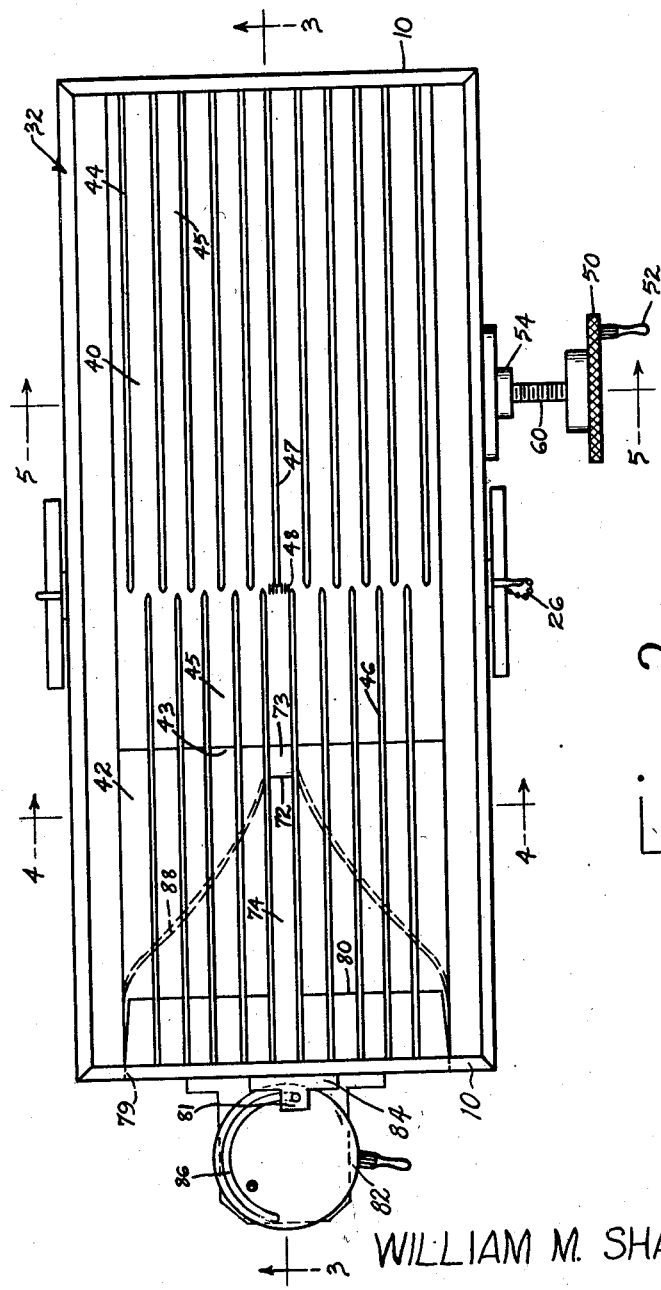

April 23, 1957 W. M. SHANHOUSE 2,789,371
DEVICE FOR DEMONSTRATING BINOMIAL PROGRESSIVE EXPANSION
Filed June 13, 1952 4 Sheets-Sheet 3
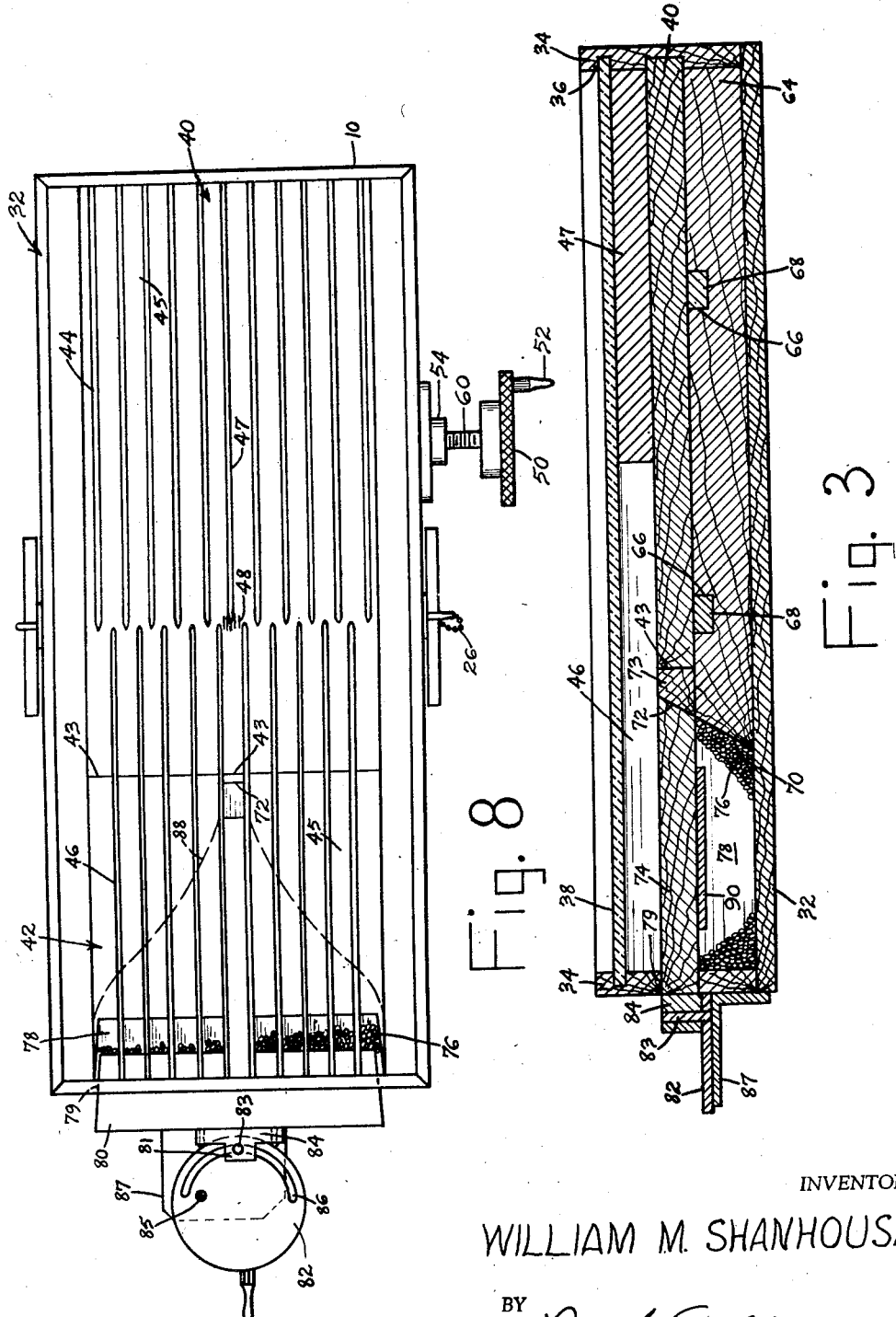
INVENTOR
WILLIAM M. SHANHOUSE
BY Louis B. Appleton
ATTORNEYS

United States Patent Office 2,789,371
Patented Apr. 23, 1957

2,789,371

DEVICE FOR DEMONSTRATING BINOMIAL PROGRESSIVE EXPANSION

William M. Shanhouse, Roslyn Heights, N. Y.

Application June 13, 1952, Serial No. 293,491

10 Claims. (Cl. 35—30)

(Granted under Title 35, U. S. Code (1952), sec. 266)

The invention described herein may be manufactured and used by or for the Government of the United States of America for governmental purposes without the payment of any royalties thereon or therefor.

This invention relates to a device adapted for use in visually instructing students in mathematical problems and is designed to illustrate binomial expansion to demonstrate the normal curve obtained.

In teaching mathematics, it is generally more satisfactory to introduce visual methods of actually seeing the principles taught physically confirmed, rather than simply providing a formula and then working out a few problems based on that formula. It is usually found that a grasp of the principles involved and a more retentive understanding of what is mathematically taking place occurs when the former method of instruction is employed. Devices to effect such visual instruction have been provided in the past, but few have been entirely satisfactory. The most common one used today is a pegged Galton board wherein pegs are spaced on a board in pyramidal effect. A converging channel above the apex channels a plurality of buckshot down the board to theoretically divide in binomial expansion. Results are generally unsatisfactory as accurately is not possible, and the device cannot be used to illustrate progressive expansion. The construction of the board makes it awkward and cumbersome to handle, and since it is not enclosed, due to its design, some of the shot usually falls off the board.

These deficiencies are overcome by the binomial expansion device of the instant invention. In demonstrating the progressive expansion of the binomial, the operator does not have to handle the beads or balls since the unit is completely enclosed and an accurate solution is always assured.

A general object of the invention is to provide a device that will illustrate binomial expansion.

Another object of the invention is to demonstrate visually the normal curve when a binomial is expanded.

Yet another object of the invention is to illustrate the problem with such predetermined skewness that may be desired.

Still another object of the invention is to demonstrate progressive expansion of the binomial.

Yet another object of the invention is to provide a unitary device, compact in construction and simple to operate.

Other objects and many of the attendant advantages of this invention will be readily appreciated as the same becomes better understood by reference to the following detailed description when considered in connection with the accompanying drawings wherein:

Fig. 2 is a plan view of the board of the invention;

Fig. 3 is a section taken on line 3—3 of Fig. 2;

Fig. 8 is similar to Fig. 2, but illustrates the ball storage space in an open, or exposed, position.

Figure 1:
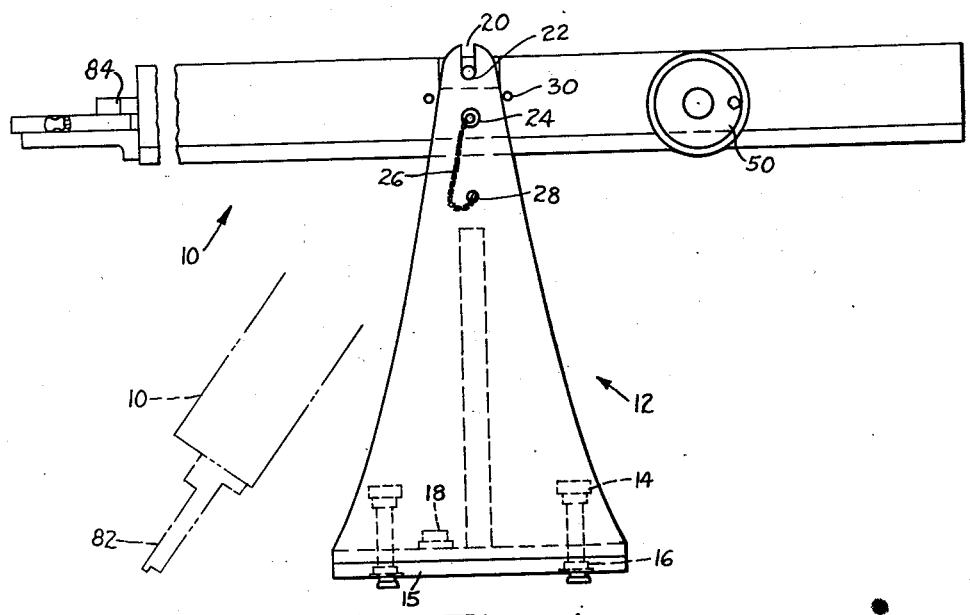
Fig. 1 is a vertical side view, and shows the device in horizontal and vertical positions.

Referring to Fig. 1, binomial expansion demonstrator 10 is pivotally mounted on stand or support 12. As the support or pedestal should be perfectly level to insure best results when working the problem, leveling screws 14 are adjustably retained in the base 15 of the stand in threaded bushing 16 fixed to the base. A suitable bench level 18 is provided to indicate a perfectly level position. Slots 20 in the upper ends of the vertical pillars of pedestal 12 receive pivot pins 22 affixed to the longitudinal edge of demonstrator 10 to enable the demonstrator to be tilted vertically when developing a binomial expansion curve. Locking pin 24 is secured by chains 26 and retaining screw 28 for insertion into an aperture in the pedestal 12 and a selected one of apertures 30 on demonstrator board 10 to lock the board in either horizontal or tilted positions.

As is readily apparent from Figs. 2–5, demonstrator 10 includes a rectangular frame 32 whose sides 34 are grooved at 36 to receive a glass window 38.

The mathematical demonstrator consists of a movable base portion or panel 40 and a fixed base portion or panel 42.

Base panel 40 is constructed so that it is laterally adjustable by means of wheel stem 60, as shall presently appear. Extending vertically from panel 40 are a plurality of rib members 44, made of any suitable, sturdy material. Rib members 44 are parallel to each other and are in equal, spaced relation. Thus, spaces 45, between each pair of ribs, form channels which are uniform and are of equal width. Ribs 44 extend from frame sides 34 to approximately half the length of the rectangular frame 32. Also extending vertically from base panel 42 are rib members 46. Rib members 46 extend from frame sides 34 (see Figs. 2 and 3) and terminate in closely spaced relation with respect to rib members 44. Ribs 46 are similar in construction to ribs 44 and also define channels 45 therebetween.

Figures 6, 7:
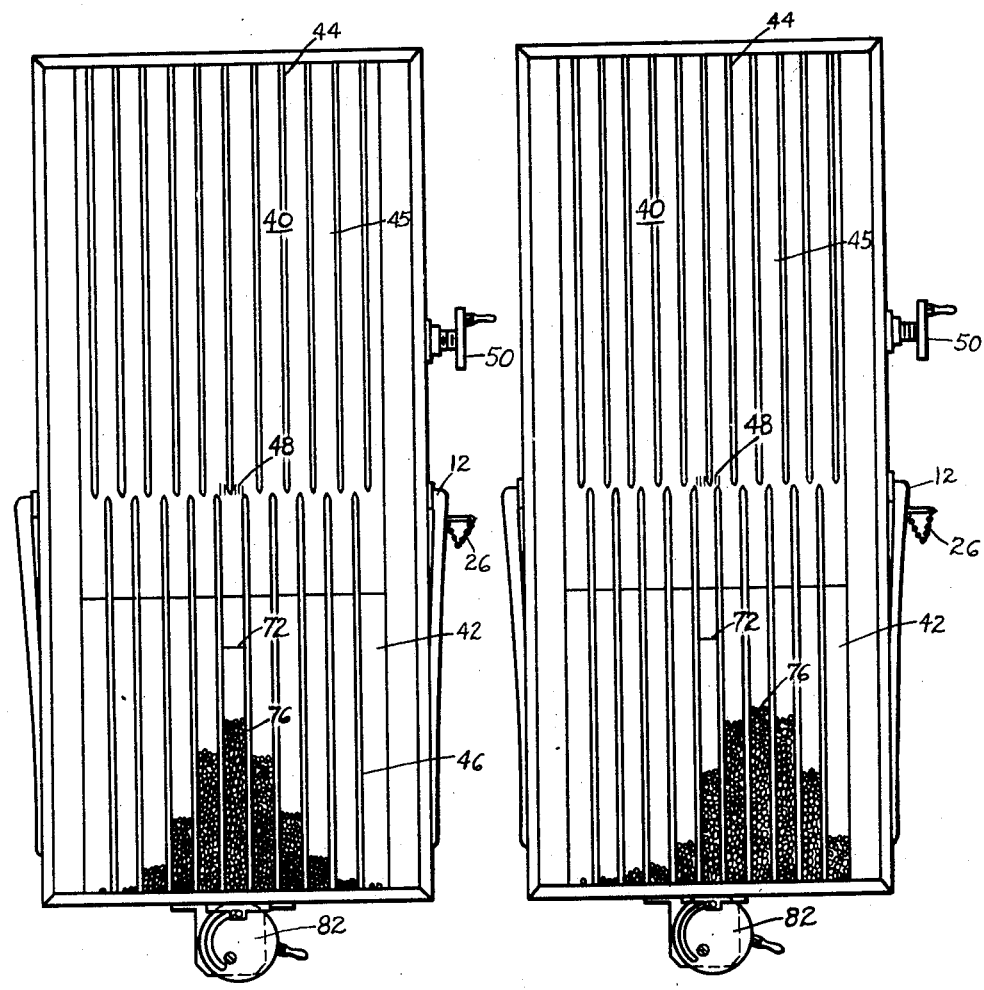
Fig. 6 illustrates the form of distribution curve obtained in a normal binomial expansion.
Fig. 7 illustrates the form of distribution curve obtained in a skewed binomial expansion.

As is apparent from Figs. 2 and 8, rib members 44 exceed rib members 46 by one, in order to carry out the demonstration. Thus, if a normal curve is to be demonstrated, base panel 40 and ribs 44 are adjusted to an offset position relative to ribs 46 by rotating wheel 50 so that ribs 44 lie between ribs 46 at exactly the median point of spaces 45, as shown in Fig. 6. If a skewed curve is to be illustrated, panel 40 is moved laterally to form the specific curve desired, this form of curve being illustrated in Fig. 7.

Figure 5:
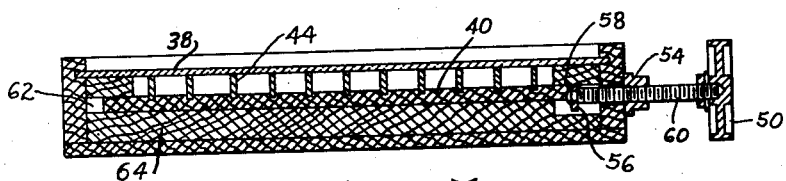
Fig. 5 is a section taken on line 5—5 of Fig. 2.
Figure 4:
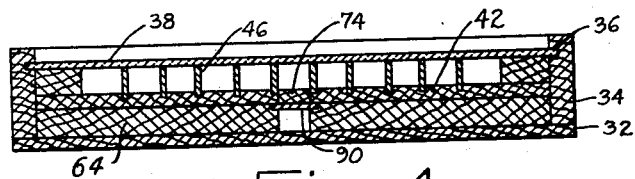
Fig. 4 is a section taken on line 4—4 of Fig. 2.

To permit ready adjustment to the desired expansion demonstration, suitable scribe lines 48 (see Fig. 2), are evenly spaced on demonstrator 10. While scribe lines 48 may be placed in any convenient location on the board, it is preferred to do so at the center of slidable panel 40 adjacent the median rib 47. Scribe lines 48 are thus located at the center of the demonstrator surface, with median rib member 47 located at the exact midpoint of said scribe lines to show a normal curve. These lines are preferably divided into tenths, although any other sub-division may be employed. When the skewed curve of Fig. 7 is to be shown, panel 40 is moved laterally to align the suitable scribe lines 48 with rib members 46. Motion of panel or base 40 is accomplished by rotation of knurled hand wheel 50 by means of handle 52. Wheel 50 is threaded for travel in a complementary threaded bushing 54 secured to and extending from the side of the demonstrator. Plate 56 of brass, or similar material, is secured to sliding panel 40 to receive head 58 of wheel stem 60. Rotation of hand wheel 50 will move base member 40 either to the left or to the right of the device, as viewed in Fig. 5. Panel 40 is of reduced width, as illustrated in Fig. 5, so that sufficient space 62 between sides 34 of frame 32 is provided to allow lateral travel within space 62 for at least the full width of one channel formed between ribs 44. Panel 40 is of greater length than panel 42 and extends beneath ribs 46 for a short distance terminating at 43, as is seen in Figs. 2 and 3. It is thus apparent that ribs 46 are secured directly to panel 42 and freely overlie a portion of panel 40. In this manner, lateral movement of panel 40 is not impeded.

Foundation support board 64 is provided within the space between frame 32 and sliding panel 40 and includes grooved guideways or tracks 66. Tracks 66 are rectangular in shape and extend transversely to the longitudinal length of the frame. Runners or rails 68 depend transversely from the bottom surface of panel 40 and are slidably seated in tracks 66. Rotation of handle 50 moves stem 60 inwardly or outwardly, thereby carrying panel 40 transversely to shift the position of rib members 44 laterally. Rail members 68 slide in trackways 66 during this movement to retain panel 40 in the proper position. Foundation support board 64 extends slightly beyond panel 40 and is secured to bottom wall 32 in any suitable manner.

The forward edge 70 of support board 64 is inclined at an angle to form a continuous sloping surface with the cut edge 72 of runway member 73 secured on board 64. As will be noted from Figs. 2, 3 and 8, runway member 73 is positioned in the centrally located channel 45 and acts as the stop means for central channel strip 74. When central channel strip 74 is retracted, beads or balls 76 are free to travel from storage space 78 adjacent board 64 and beneath fixed panel 42, along inclined surfaces 70, 72 and central channel 45.

Side 34 of frame 32 adjacent fixed panel 42 contains a passageway or elongated opening 79 to receive movable block 80 which, when retracted, exposes storage chamber 78 below. Thus, when the problem is about to be illustrated, the beads 76 from the previous demonstration drop from panel 42 (see Figs. 6 and 7) to chamber 78 (see Figs. 3 and 8). Block 80 and channel strip 74 are adapted to move together away from the proximal end of panel 42. The construction thereof may be unitary, or of separate sections, arranged to move in unison.

In order to slide block 80 into opening or closing position, a bar 84 is fastened in any desired manner to the outer edge of block 80. Bar 84 includes extension 81 having depending pin 83 adapted to ride in arcuate slot 86 provided in cam plate 82. Screw 85, eccentrically extending through the cam plate, is anchored in angle bar 87 to support cam plate 82 for horizontal rotation. Angle bar 87 is secured to the outer edge of side 34. Guide strips 88, as shown by dotted lines in Figs. 2 and 8, serve to channel travel of balls 76 towards the central channel member 74. When eccentric cam plate 82 is rotated from the position illustrated in Fig. 2 to the position shown in Fig. 8, block 80 is retracted through passage 79, moving central channel strip 74 with it. This movement provides a space or outlet between the end of strip 74 and inclined edge 72. When the board is pivoted on pins 22, balls 76, guided along strips 88, travel up inclined edge 72 onto central channel surface 45, between spaced ribs 46. The balls continue to travel along the central channel until they reach rib member 47, which rib causes the beads to divide on each side of rib member 47. Cam plate 82 is roated to close the openings, and the device is then ready for demonstration of the problem. Reinforcing strip 90 is secured to the bottom of channel strip 74.

To illustrate the operation of the device, let it be assumed that the binomial is to be expanded to show a normal curve. Fig. 6 discloses the form of distribution curve obtained. In obtaining a distribution curve, the frame is pivoted on pins 22, seated in slots 20 on pedestal 12, from the dotted line position in Fig. 1 to a similar position on the other side of the pedestal 12. When frame 32 is tilted to the right, as viewed in Fig. 1, beads 76 are divided into two equal portions, having for instance, an equal division, such as $a+b$, by a median rib 47. Continued alternate pivoting of the frame causes the streams of beads to divide again in the ratio of $a^2:2ab:b^2$, then to $a^3$; $3a^2b:3ab^2$; $b^3$, then to $$a^4:4a^3b:6a^2b^2:4ab^3:b^4$$

and so forth, the expansion being limited only by the size of the frame. The curve thus formed by the coefficient of each term of the expansion is visually presented to the student. Wheel 50 is rotated in order to set the demonstrator for a normal curve just described. Rotation of wheel 50 causes sliding panel 40 to shift laterally in space 62 until rib 47 is positioned midway between the ends of opposed, parallel ribs 46. Beads 76 are brought to the surface by rotating cam 82 into the position shown in Fig. 8, to expose chamber 78. Frame 32 is then pivoted on pins 22, causing beads 76 to travel up incline 72 and on runway member 73 to the opposite side of the demonstrator surface. Median rib member 47 divides beads 76 into approximately two equal halves, thereby illustrating the first coefficient of expansion to be $\frac{1}{2}+\frac{1}{2}$ or $a+b$. Cam 82 is reversed to close chamber 78 and again presents an uninterrupted plate surface 42.

A reverse tilt of board 10 to the dotted line position of Fig. 1 reverses the flow of beads 76 towards plate 42 causing half the beads in one channel on plate 40 to divide evenly between center channel 74 and the adjacent channel. The beads in the other channel of slideable plate 40 also divide evenly between center channel 74 and the adjacent channel on the other side. As a result, the binomial has been squared and a distribution ratio of $a^2:2ab:b^2$ is obtained.

Thus, one quarter of balls 76 will be positioned on each side of center channel 74, which itself now contains one half of the total. This operation is repeated until all of the beads have been distributed to form the curve seen in Fig. 6. The number of channels used is always one more than the power of expansion. Thus the binomial has been expanded to the tenth power, in the illustrated example of Fig. 6.

The invention is also capable of showing a skewed curve, and Fig. 7 discloses such application. Panel 40 is moved horizontally to offset ribs 44 with respect to ribs 46 in the desired degree of askewity. Thus, instead of obtaining the binomial curve of ½ plus ½, as in the preceding example, a position of $\frac{4}{10}$ and $\frac{6}{10}$, or any other subdivision of one may be substituted. In working this problem, it is necessary to alternate the position of ribs 44 with respect to ribs 46 each time the board is pivoted. This is due to the fact that since the board is pivoted alternately on each side of stand 12, the positions of the skewed curve are also alternately reversed. Unless this is compensated, the curve would tend to straighten itself out. Such result is avoided by alternating the position of ribs 44 with respect to ribs 46. While manual control of the sliding panel is illustrated, it is obvious that automatic control may be substituted, if so desired.

Thus, a device capable of expanding the binomial to any power desired, and one that is simple in construction and operation has been perfected.

Obviously many modifications and variations of the present invention are possible in the light of the above teachings. It is therefore to be understood that within the scope of the appended claims the invention may be practiced otherwise than as specifically described.

I claim:

1. In a mathematical demonstrator, a rectangular frame having side walls and a bottom wall, longitudinally aligned base panels mounted on said frame in spaced relation to said bottom wall to form a chamber therebetween, adjustment means extending through said frame and secured to one of said panels for transverse movement thereof, a slide block including a central channel strip slidably mounted in said frame, for selectively exposing and closing said chamber, bead means stored in said chamber and adapted to be transferred to the surface of said base panels, equidistantly spaced parallel rib members extending longitudinally on said base panels forming channels therebetween and means supporting said rectangular frame for pivoted movement about a transverse axis.

2. In a mathematical demonstrator, a rectangular frame having side walls and a bottom wall, longitudinally aligned base panels mounted on said frame in spaced relation to said bottom wall to form a chamber therebetween, a slide block including a central channel strip slidably mounted in said frame for selectively exposing and closing said chamber, bead means stored in said chamber and adapted to be transferred to the surface of said base panels, equidistantly spaced parallel rib members extending longitudinally on said base panels forming channels therebetween and means supporting said rectagular frame for pivoted movement about a traverse axis, one of said base panel members being transversely adjustable, and an inclined runway member extending from the central channel on said other base panel and into the chamber below, said block channel strip engaging said inclined runway member when in closed position.

3. The combination of claim 2, including operating means for said slide block comprising a cam plate, an arcuate slot in said cam plate and pin means secured to said slide block and riding in said cam plate slot, whereby rotation of said cam plate causes the pin to move in said slot to slide said block.

4. The combination of claim 3, wherein said movable panel is supported and guided on the frame by means comprising a support board secured on the bottom wall of the frame, transverse track means in said board and transverse rail means secured to the bottom of said movable base panel and riding in said track means.

5. A binomial expansion demonstrator comprising a frame, a fixed panel secured in said frame, a transversely movable panel secured in said frame, means dividing said fixed panel into a plurality of equidistantly spaced and longitudinally extending parallel channels, means dividing said movable panel into a plurality of equi-distantly spaced and longitudinally parallel channels, means on said movable panel to adjust it transversely, beads freely movable in said channels, a support member for said frame, slot means in said support member and pivot means on said frame and retained in said slot means pivotally supporting said frame for rocking movement about a transverse axis.

6. A binomial expansion demonstrator comprising a frame, a fixed panel secured in said frame, a transversely movable panel secured in said frame, means dividing said fixed panel into a plurality of equidistantly spaced and longitudinally extending parallel channels, means dividing said movable panel into a plurality of equi-distantly spaced and longitudinally parallel channels, means on said movable panel to adjust it transversely, beads freely movable in said channels, a support member for said frame, slot means in said support member and pivot means on said frame and retained in said slot means pivotally supporting said frame for rocking movement about a transverse axis, said parallel channel dividing means comprising longitudinal rib means.

7. A mathematical instruction device comprising a frame, a fixed base panel mounted on said frame, a coplanar base panel transversely movable relative to said fixed panel mounted on said frame, guide means longitudinally disposed on each of said panels, said guide means being parallel and equidistantly spaced, bead means carried in said frame and means to tilt said frame about a transverse axis for subdividing said bead means.

8. A binomial expansion demonstrator comprising, a frame having a bottom wall and side walls, a transversely movable base member mounted in said frame and spaced from the bottom wall, a fixed base member mounted in said frame and spaced from the bottom wall, equidistantly spaced parallel ribs secured longitudinally on said base members, means on one of said base members movable to provide an entrance opening into the space between said base members and wall, bead means stored in the space for movement from said space through said opening and between said ribs, and pivot means supporting said frame for rocking movement about a transverse axis.

9. A binomial expansion demonstrator comprising, a frame having a bottom wall and side walls, a transversely movable base member mounted in said frame and spaced from said bottom wall, a fixed base member mounted in said frame and spaced from the bottom wall, equi-distantly spaced parallel ribs secured longitudinally on said base members, a support including transverse track means secured on said frame beneath the movable base member, transverse rail means secured on said movable base member and seated in said track means, means to slide said movable base means transversely, guided by said rail and track means, means on one of said base members movable to provide an entrance opening into the space between said base members and the bottom wall, bead means stored in the space between said base members and walls for movement from said space through said opening and between said ribs, and pivot means supporting said frame for rocking movement about a transverse axis.

10. The combination of claim 9 wherein said slide means comprises a threaded stem member extending through said frame and secured in said movable base member and operating means on said stem member adapted to be actuated to slide the rail means in said track means.

References Cited in the file of this patent

UNITED STATES PATENTS 1,722,986   McAlice _____ July 30, 1929

OTHER REFERENCES

An Introduction to the Theory of Statistics, Yule & Kendall, 13th ed. revised 1947, pages 175 and 176. Published by Charles Griffin & Co. Ltd., London.